Sept. 1, 1931.   C. F. SCHUTTE   1,821,482
HAMMER MILL
Filed June 18, 1930
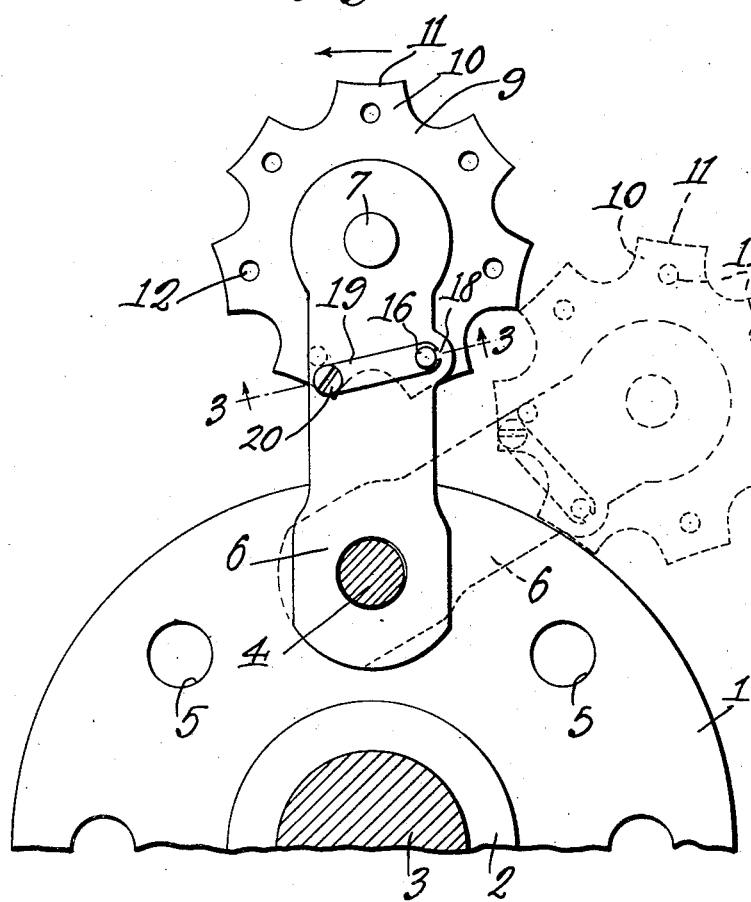
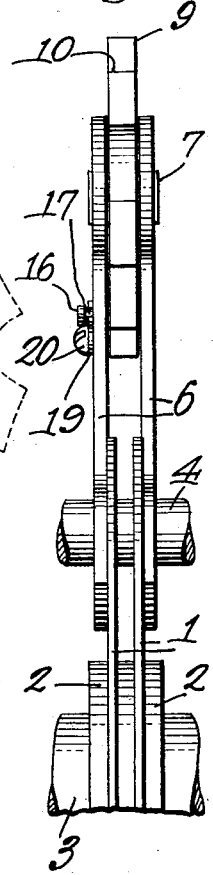
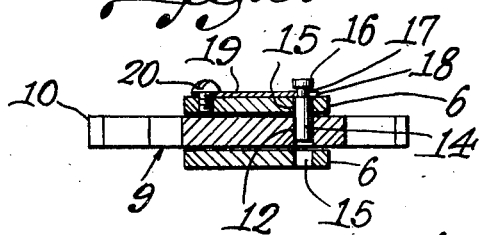
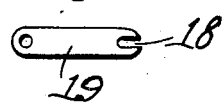
C. F. Schutte Inventor
By C. A. Snow & Co.
Attorneys.

Patented Sept. 1, 1931

1,821,482

UNITED STATES PATENT OFFICE

CHARLES F. SCHUTTE, OF BUFFALO, NEW YORK

HAMMER MILL

Application filed June 18, 1930. Serial No. 462,013.

The device forming the subject matter of this application is a hammer mill, of the kind used for cutting up and breaking rags and any other substances, the construction being of that sort wherein the hammer is connected by a link to a rotary member for swinging movement.

One of the objects of the invention is to provide novel means whereby the hammer may be adjusted to present new surfaces to the work.

Another object of the invention is to provide means whereby the discs or rotary members will not be damaged when the hammers fly back from operative position into inoperative position.

Another object of the invention is to supply novel means for holding the hammers in adjusted positions, so that new working surfaces on the hammers may be presented to the work.

It is within the province of the disclosure to improve generally and to enhance the utility of devices of that type to which the present invention appertains.

With the foregoing and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in elevation a device constructed in accordance with the invention;

Figure 2 is an elevation wherein the structure is shown at right angles to the showing of Figure 1;

Figure 3 is a section on the line 3—3 of Figure 1;

Figure 4 is an elevation showing one of the shafts;

Figure 5 is a plan of the tongue which actuates the latch.

Rotary members 1, in the form of discs, are arranged in pairs, and are attached at 2 to a shaft 3 which is supported for rotation. Pivot elements 4 are mounted in openings 5 arranged in a circle around the discs 1, the openings 5 being in registration. The pivot element 4 may pass through several pairs of discs.

The inner ends of radius arms 6 are mounted to swing on the pivot element 4. The radius arms 6 are located outwardly of the discs 1. Shafts 7 are secured by threading 8, or otherwise, in the outer ends of the radius arms 6, and join them together.

Disc-like hammers 9 are provided, and have openings whereby the hammers are mounted on the shafts 7, between the radius arms 6. The hammers 9 can be rotated for adjustment on the shafts 7, to present new working surfaces, but, in the ordinary operation of the machine, the hammers 9 do not rotate on the shafts 7.

The hammers 9 have peripheral projections 10 which are shaped at their ends, as shown at 11, to conform to the peripheries of the discs 1. Seats or openings 12 are formed in the projections 10 of the hammers 9 and extend entirely therethrough.

The numeral 14 marks a latch, in the form of a pin, mounted for right line sliding movement in openings 15 formed in the links 6. The latch 14 is adapted to be engaged in any of the seats or openings 12 of the hammer 9. At one end, the latch 14 has a head 16 connected to the body portion of the latch by a reduced neck 17. The neck 17 is loosely received in a notch 18 formed in one end of a spring tongue 19 connected by a securing element 20 to one of the links 6.

In practical operation, when the rotary members 1 turn, selected projections 10 of the hammer 9 come into contact with the material, and cut or break it up. When it is desired to present a new working surface the latch 14 may be withdrawn out of the seat 12 in any tooth or projection 10 of the hammer 9, the hammer may be rotated on the shaft 7 to present a new projection in working position, and the latch 14 may be engaged with the opening 12 of the hammer 9, under the impulse of the spring tongue 19, to hold the hammer in the position to which it has been rotatably adjusted. It is possible, therefore, to present many new working surfaces to the material, and the hammer will have a long effective life.

Not a little difficulty has been experienced heretofore, by reason of the fact that the discs 1 are damaged when the hammer 9 reacts and springs back against the discs, as shown in dotted line in Figure 1 of the drawings. In the present invention, the discs 1 will not be injured when the hammer swings back, as aforesaid, because the ends 11 of the projection 10 on the hammer 9 rest evenly upon the peripheries of the discs 1 and will not batter the discs.

Having thus described the invention, what is claimed is:

1. A hammer mill comprising a rotary member, a radius arm pivoted to the rotary member, a hammer journaled for rotary adjustment on the arm and having separate working surfaces, said working surfaces conforming to the periphery of the rotary member when the hammer is swung backwardly to inoperative position, in engagement with the rotary member, thereby to prevent battering of the rotary member when the hammer swings to said position, and means for holding the hammer against rotary movement with respect to the arm.

2. A hammer mill comprising a rotary member, a radius arm pivoted to the rotary member, a shaft mounted in the outer end of the radius arm, a hammer having working surfaces, the hammer having an opening receiving the shaft and enabling the hammer to be rotated for adjustment, thereby to present any of said surfaces in operative position, the hammer being provided with seats which are spaced from the opening and are independent thereof, and a latch movable in the radius arm, transversely of the radius arm, and engageable in any of the seats to hold one of the working surfaces in operative position.

In testimony that I claim the foregoing as my own, I have hereto affixed my signature.

CHARLES F. SCHUTTE.